(12) United States Patent
Park et al.

(10) Patent No.: US 9,927,661 B2
(45) Date of Patent: Mar. 27, 2018

(54) LIQUID CRYSTAL DISPLAY AND METHOD OF MANUFACTURING THE SAME

(71) Applicant: Samsung Display Co. Ltd., Yongin (KR)

(72) Inventors: Hyung Jun Park, Seongnam-si (KR); Byoung Sun Na, Seoul (KR); Seon Kyoon Mok, Hwaseong-si (KR); Seong Young Lee, Hwaseong-si (KR); Hwan Young Jang, Daegu (KR)

(73) Assignee: SAMSUNG DISPLAY CO. LTD., Gyeonggi-Do (KR)

( * ) Notice: Subject to any disclaimer, the term of this patent is extended or adjusted under 35 U.S.C. 154(b) by 0 days.

(21) Appl. No.: 15/158,065

(22) Filed: May 18, 2016

(65) Prior Publication Data

US 2017/0097533 A1    Apr. 6, 2017

(30) Foreign Application Priority Data

Oct. 2, 2015 (KR) .................. 10-2015-0138967

(51) Int. Cl.
| | |
|---|---|
| G02F 1/1339 | (2006.01) |
| G02F 1/1333 | (2006.01) |
| G02F 1/1343 | (2006.01) |
| G02F 1/1337 | (2006.01) |
| G02F 1/1362 | (2006.01) |

(52) U.S. Cl.
CPC ........ *G02F 1/13394* (2013.01); *G02F 1/1337* (2013.01); *G02F 1/133345* (2013.01); *G02F 1/134309* (2013.01); *G02F 2001/13398* (2013.01); *G02F 2001/136263* (2013.01); *G02F 2201/121* (2013.01)

(58) Field of Classification Search
None
See application file for complete search history.

(56) References Cited

U.S. PATENT DOCUMENTS

| 8,810,744 B2 | 8/2014 | Lim et al. |
| 2014/0176850 A1 | 6/2014 | Kim et al. |
| 2014/0335290 A1* | 11/2014 | Zhang ............... G02F 1/1339 |
| | | 428/1.55 |

FOREIGN PATENT DOCUMENTS

| JP | 11174469 | 7/1999 |
| JP | 4688441 | 2/2011 |
| KR | 100428520 | 4/2004 |

* cited by examiner

*Primary Examiner* — Ashok Patel
(74) *Attorney, Agent, or Firm* — Cantor Colburn LLP

(57) ABSTRACT

A liquid crystal display includes: a first substrate on which a display area and a non-display area disposed around the display area are defined; a second substrate disposed opposite to the first substrate; a common electrode disposed on the second substrate; a common power supply line disposed in the non-display area of the first substrate to provide a common voltage; and a spacer disposed on the common power supply line to connect the common power supply line and the common electrode, where the spacer includes a conductive ball, and the conductive ball includes a heating solution.

13 Claims, 11 Drawing Sheets

LIQUID CRYSTAL DISPLAY AND METHOD OF MANUFACTURING THE SAME

This application claims priority to Korean Patent Application No. 10-2015-0138967 filed on Oct. 2, 2015, and all the benefits accruing therefrom under 35 U.S.C. § 119, the content of which in its entirety is herein incorporated by reference.

BACKGROUND

1. Field

Exemplary embodiments of the invention relate to a liquid crystal display ("LCD") and a method of manufacturing the LCD.

2. Description of the Related Art

With the development of multimedia, various types of display devices such as liquid crystal displays ("LCD"s) and organic light-emitting displays ("OLED"s) are widely used in various fields.

In particular, LCDs are one of the most widely used types of flat panel display. Generally, an LCD includes a pair of substrates including field generating electrodes, such as pixel electrodes and a common electrode, and a liquid crystal layer interposed between the two substrates. In an LCD, voltages are applied to field generating electrodes to generate an electric field in the liquid crystal layer. Accordingly, the alignment of liquid crystal molecules of the liquid crystal layer is determined, and polarization of incident light is controlled. As a result, a desired image is displayed on the LCD.

As the size and resolution of LCDs gradually increases, the number of wirings used to precisely control the LCDs increases. However, in such LCDs, as various wirings occupy more space, a non-display area may be increased.

SUMMARY

In a liquid crystal display ("LCD"), where the number of the wirings is increased to realize a large-size and high resolution display, a contact defect may occur due to an unstable electrical contact between wirings in a non-display area. In such an LCD, various technical attempts are being made to delicately connect various wirings disposed in the non-display area without increasing the non-display area to realize a large-size and high resolution display with slim bezel.

Embodiments of the invention relate to an LCD in which a common power supply line and a common electrode are electrically connected to each other in a stable manner.

Embodiments of the invention relate to an LCD having a narrow bezel by maintaining a stable electrical connection between a common power supply line and a common electrode without increasing a non-display area.

Embodiments of the invention relate to a method of manufacturing an LCD in which a common power supply line and a common electrode are electrically connected to each other in a stable manner.

Embodiments of the invention relate to a method of manufacturing an LCD having a narrow bezel by maintaining a stable electrical connection between a common power supply line and a common electrode without increasing a non-display area.

According to an embodiment of the invention, an LCD includes: a first substrate on which a display area and a non-display area disposed around the display area are defined; a second substrate disposed opposite to the first substrate; a common electrode disposed on the second substrate; a common power supply line disposed in the non-display area of the first substrate to provide a common voltage; and a spacer disposed on the common power supply line to connect the common power supply line and the common electrode, where the spacer includes a conductive ball, and the conductive ball includes a heating solution.

In an embodiment, the LCD may further include: a first alignment layer disposed on an entire surface of the first substrate; and a second alignment layer which is disposed on an entire surface of the second substrate.

In an embodiment, a thickness of a portion of the second alignment layer which overlaps an upper end of the spacer may be smaller than a thickness of a portion of the second alignment layer which does not overlap the upper end of the spacer.

In an embodiment, the LCD may further include a connecting electrode which is disposed on the common power supply line.

In an embodiment, a lower end of the spacer may contact the connecting electrode, and an upper end of the spacer may contact the common electrode.

In an embodiment, the LCD may further include: a gate insulating layer disposed on the common power supply line; a passivation layer disposed on the gate insulating layer; wherein a contact hole is defined through the gate insulating layer and the passivation layer, and the contact hole exposes the common power supply line.

In an embodiment, the connecting electrode may be disposed on the contact hole to contact the common power supply line.

In an embodiment, the spacer may have electrical conductivity.

In an embodiment, the spacer may electrically connect the common power supply line and the common electrode.

In an embodiment, the conductive ball may further include a packing material which stores the heating solution and a conductive layer which covers the packing material.

In an embodiment, the heating solution may generate heat when a pressure is applied to the conductive ball.

In an embodiment, the heating solution may include a supersaturated sodium acetate solution or a supersaturated sodium thiosulfate solution, which generates heat when pressure is applied to the conductive ball.

According to another embodiment of the invention, a method of manufacturing an LCD includes: preparing a first substrate, on which a display area and a non-display area disposed around the display area are defined, and a common power supply line is disposed in the non-display area of the first substrate to provide a common voltage; providing a spacer, which includes a conductive ball, on the common power supply line; preparing a second substrate on which a common electrode is provided, and disposing the second substrate to face the first substrate; and bonding the first substrate and the second substrate together, where the conductive ball includes a heating solution.

In an embodiment, the preparing the first substrate, on which a display area and a non-display area disposed around the display area are defined, and a common power supply line is disposed in the non-display area to provide a common voltage, may include providing a first alignment layer on an entire surface of the first substrate.

In an embodiment, the preparing the second substrate, on which the common electrode is provided, and the disposing the second substrate to face the first substrate may include providing a second alignment layer on an entire surface of the second substrate.

In an embodiment, a thickness of a portion of the second alignment layer which overlaps an upper end of the spacer may be smaller than a thickness of a portion of the second alignment layer which does not overlap the upper end of the spacer.

In an embodiment, the spacer may electrically connect the common power supply line and the common electrode.

In an embodiment, the conductive ball may further include a packing material which stores the heating solution and a conductive layer which covers the packing material.

In an embodiment, the bonding the first substrate and the second substrate together may include causing the heating solution to generate heat by applying a pressure to the conductive ball such that the heat generated by the heating solution removes at least part of each of the first alignment layer and the second alignment layer which overlap the spacer.

BRIEF DESCRIPTION OF THE DRAWINGS

The above and other aspects and features of the invention will become more apparent by describing in detail exemplary embodiments thereof with reference to the attached drawings, in which.

DETAILED DESCRIPTION

Figure 1:
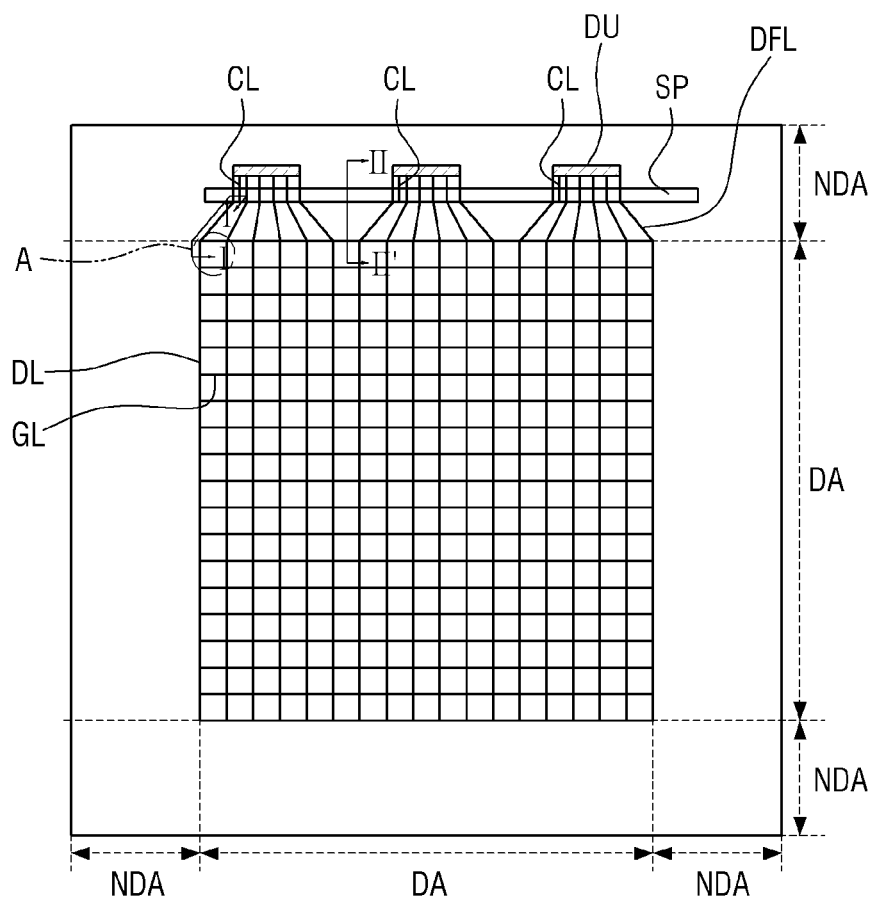
FIG. 1 is a schematic view of a liquid crystal display ("LCD") according to an embodiment of the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described in detail with reference to the accompanying drawings.

Figure 2:
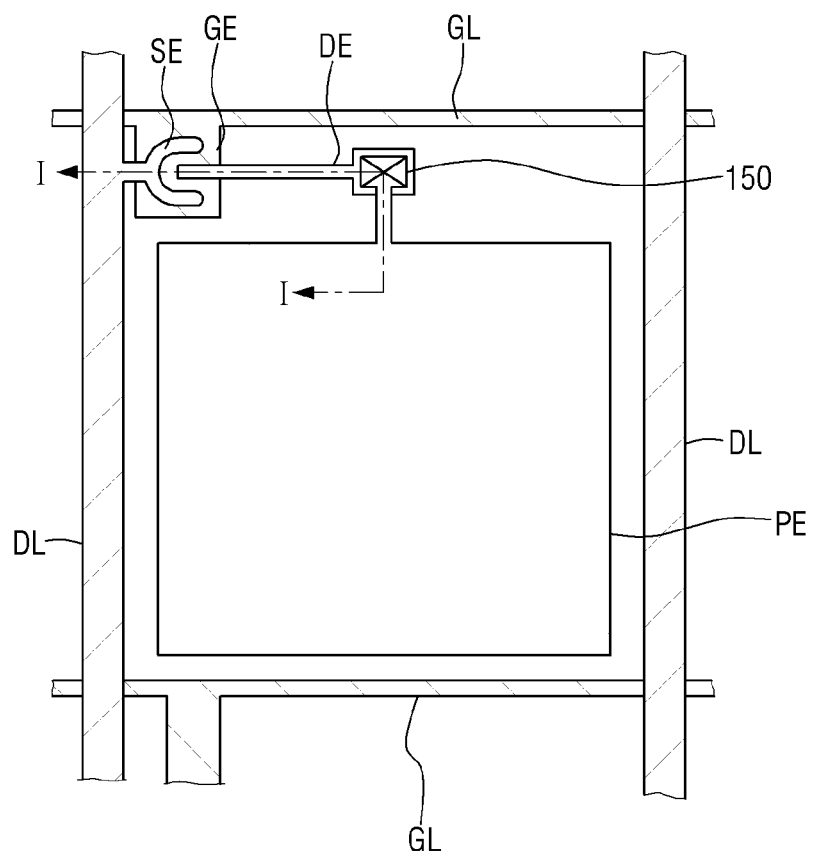
FIG. 2 is an enlarged view of a portion 'A' of FIG. 1.
Figure 3:
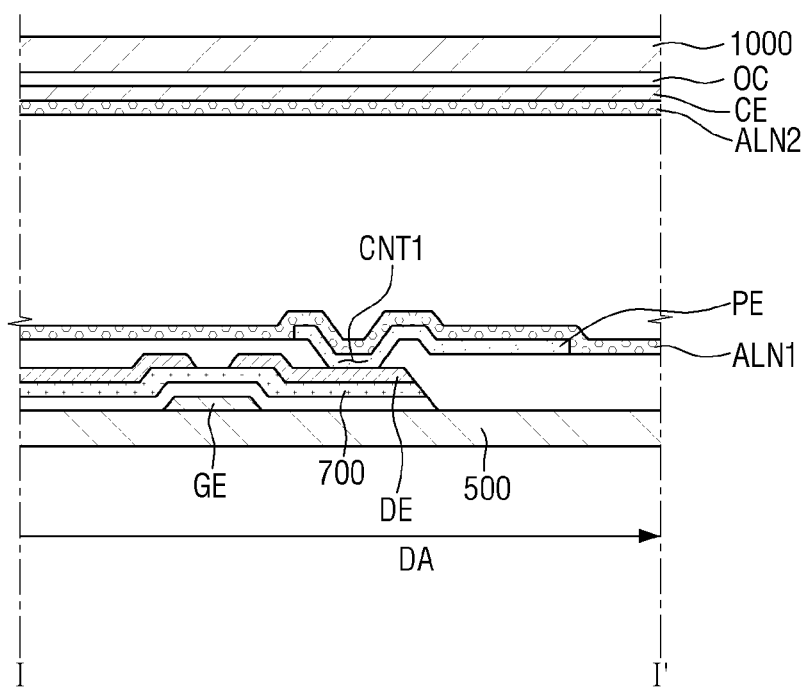
FIG. 3 is a cross-sectional view taken along line I-I' of FIG. 2.
Figure 4:
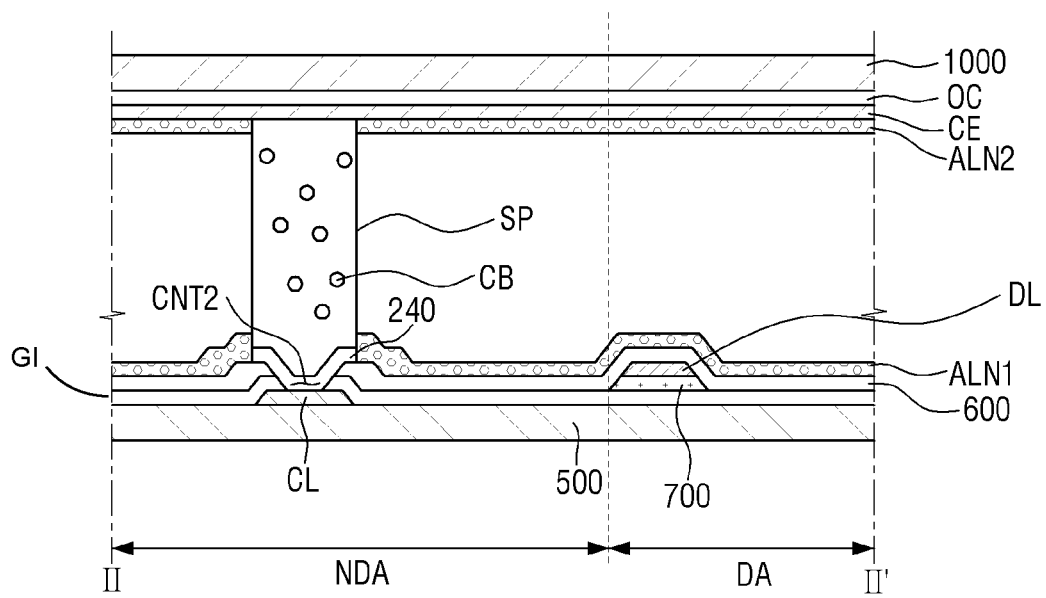
FIG. 4 is a cross-sectional view taken along line II-IF of FIG. 1.

FIG. 1 is a schematic view of a liquid crystal display ("LCD") according to an embodiment of the invention. FIG. 2 is an enlarged view of a portion 'A' of FIG. 1. FIG. 3 is a cross-sectional view taken along line I-I' of FIG. 2. FIG. 4 is a cross-sectional view taken along line II-IF of FIG. 1.

Referring to FIGS. 1 through 4, an exemplary embodiment of the LCD includes a first substrate 500 on which a display area DA and a non-display area NDA disposed around the display area DA are defined, a second substrate 1000 which is opposite to or faces the first substrate 500 and includes a common electrode CE, a common power supply line CL which is disposed in the non-display area NDA of the first substrate 500 to provide a common voltage, and a spacer SP which is disposed on the common power supply line CL to connect the common power supply line CL and the common electrode CE and includes a conductive ball (i.e., one or more conductive balls) CB. In such an embodiment, the conductive ball CB or at least some of the conductive balls CB include a heating solution 310.

The first substrate 500 may include or be made of a material having heat-resisting and light-transmitting properties. The first substrate 500 may include or be made of, but not limited to, transparent glass or plastic. The display area DA and the non-display area NDA are defined on the first substrate 500.

The display area DA is an area or portion of the display device in which an image is displayed, and the non-display area NDA is an area or portion of the display device in which various signal lines are disposed to enable the display area DA to display an image.

The display area DA will now be described in greater detail with reference to FIGS. 2 and 3. The display area DA may include a plurality of pixels connected to a plurality of data lines DL and a plurality of gate lines GL. In one embodiment, for example, a plurality of pixel areas may be defined in the display area DA based on an area defined by the data lines DL and the gate lines GL. FIG. 2 is an enlarged view of a pixel (the portion 'A' of FIG. 1) of the pixels in the display area DA, where the pixels have substantially the same as each other, e.g., as the pixel shown in FIG. 2.

A gate electrode GE may be disposed on the first substrate 500. As used herein, the gate electrode GE and a gate line GL will be collectively referred to as a gate wiring (GL, GE).

The gate wiring (GL, GE) may include at least one selected from aluminum (Al)-based metal such as an aluminum alloy, silver (Ag)-based metal such as a silver alloy, copper (Cu)-based metal such as a copper alloy, molybdenum (Mo)-based metal such as a molybdenum alloy, chrome (Cr), titanium (Ti), and tantalum (Ta). However, the above materials are merely exemplary, and the material of the gate wiring (GL, GE) is not limited to the above materials. The gate wiring (GL, GE) may include or be made of a metal or polymer material having characteristics desired to implement a desired display device.

The gate line GL may receive a driving signal. A plurality of gate lines GL may extend in a first direction, for example, a horizontal direction as shown in FIG. 2.

The gate electrode GE may protrude from the gate line GL and define three terminals of a thin-film transistor ("TFT") together with a source electrode SE and a drain electrode DE which will be described later.

The gate wiring (GL, GE) may have a single layer structure. However, the gate wiring (GL, GE) is not limited to the single layer structure and may alternatively have a multilayer structure such as a double or a triple layer structure, for example.

A gate insulating layer GI may be disposed on the first substrate 500 and the gate wiring (GL, GE). The gate insulating layer GI may cover the first substrate 500 and the gate wiring (GL, GE) and may be disposed on the entire surface of the first substrate 500 or formed to cover the entire surface of the first substrate 500.

The gate insulating layer GI may include or be made of at least one materials selected from an inorganic insulating material, such as silicon oxide (SiOx) or silicon nitride (SiNx), and an organic insulating material, such as benzocyclobutene ("BCB"), an acrylic material, or polyimide. However, the above materials are merely exemplary, and the material of the gate insulating layer GI is not limited to the above materials.

A semiconductor pattern layer 700 may be disposed on the gate insulating layer GI. At least part of the semiconductor pattern layer 700 may overlap the source electrode SE and/or the drain electrode DE which will be described later.

The semiconductor pattern layer 700 may be disposed on the gate insulating layer GI.

The semiconductor pattern layer 700 may include amorphous silicon or polycrystalline silicon. However, the material of the semiconductor pattern layer 700 is not limited to the above materials, and the semiconductor pattern layer 700 may include an oxide semiconductor.

In an exemplary embodiment, where the semiconductor pattern layer 700 is an oxide semiconductor, the semiconductor pattern layer 700 may include zinc oxide (ZnO). Further, the semiconductor pattern layer 700 may be doped with one or more ions of at least one selected from gallium (Ga), indium (In), tin (Sn), zirconium (Zr), hafnium (Hf), cadmium (Cd), silver (Ag), copper (Cu), germanium (Ge), gadolinium (Gd), titanium (Ti), and vanadium (V). In one embodiment, for example, the semiconductor pattern layer 700 which is an oxide semiconductor may include at least one material selected from ZnO, ZnGaO, ZnInO, ZnSnO, GaInZnO, CdO, InO, GaO, SnO, AgO, CuO, GeO, GdO, HfO, TiZnO, InGaZnO, and InTiZnO. However, these are merely exemplary, and the type of the oxide semiconductor is not limited to the above materials.

The semiconductor layer 700 may have various shapes such as an island shape and a linear shape. In an exemplary embodiment, where the semiconductor pattern layer 700 is linearly shaped, the semiconductor pattern layer 700 may be located under a data line DL and extend onto the gate electrode GE.

In an exemplary embodiment, the semiconductor pattern layer 700 may have substantially the same shape as a data wiring (DL, SE, DE) in areas excluding a channel region CH. In such an embodiment, the data wiring (DL, SE, DE) may overlap the semiconductor pattern layer 700 in all areas excluding the channel region CH. The channel region CH may be disposed between the source electrode SE and the drain electrode DE which are located opposite each other. The channel region CH may electrically connect the source electrode SE and the drain electrode DE, and the specific shape of the channel region CH is not limited to a particular shape.

An ohmic contact layer (not illustrated) heavily doped with an n-type impurity may be disposed on the semiconductor pattern layer 700. The ohmic contact layer may overlap an entire or part of the semiconductor pattern layer 700. In an exemplary embodiment, in which the semiconductor pattern layer 700 includes an oxide semiconductor, the ohmic contact layer may be omitted.

The data wiring (DL, SE, DE) may be disposed on the semiconductor pattern layer 700.

The data wiring (DL, SE, DE) may include the data line DL, the source electrode SE, and the drain electrode DE. The data line DL extends along a second direction crossing the first direction, for example, a vertical direction as shown in FIG. 2, and intersects the gate line GL.

The source electrode SE branches off from the data line DL and extends onto the semiconductor pattern layer 700, and the drain electrode DE is separated or spaced apart from the source electrode SE to face the source electrode SE.

In an exemplary embodiment, the data wiring (DL, SE, DE) may have a single layer structure or a multilayer structure including at least one selected from nickel (Ni), cobalt (Co), titanium (Ti), silver (Ag), copper (Cu), molybdenum (Mo), aluminum (Al), beryllium (Be), niobium (Nb), gold (Au), iron (Fe), selenium (Se), and tantalum (Ta). In an embodiment, the data wiring (DL, SE, DE) may include or be made of an alloy of any one of the above metals and oat least one element selected from titanium (Ti), zirconium (Zr), tungsten (W), tantalum (Ta), niobium (Nb), platinum (Pt), hafnium (Hf), oxygen (O), and nitrogen (N). However, the above materials are merely exemplary, and the material of the data wiring (DL, SE, DE) is not limited to the above materials.

A passivation layer 600 may be disposed on the data wiring (DL, SE, DE). The passivation layer 600 may be a planarization layer and cover the data line DL, the source electrode SE, the semiconductor pattern layer 700 and the drain electrode DE. In an embodiment, the passivation layer 600 may be disposed on or formed to cover the entire surface of the first substrate 500. The passivation layer 600 may include or be made of an organic insulating material or an inorganic insulating material.

A contact hole CNT1 is defined in the passivation layer 600. The contact hole CNT1 may be formed through the passivation layer 600 to expose at least part of a surface of the drain electrode DE.

A pixel electrode PE may be disposed on the passivation layer 600. The pixel electrode PE may be electrically connected to the drain electrode DE through the contact hole CNT1 which is defined or formed through the passivation layer 600.

The pixel electrode PE may include or be made of a transparent conductor such as indium tin oxide ("ITO") or indium zinc oxide ("IZO") or a reflective conductor such as aluminum.

In an exemplary embodiment, as shown in FIG. 2, the pixel electrode PE may be shaped like a flat plate. However, the shape of the pixel electrode PE is not limited to the flat plate. In an alternative embodiment, the pixel electrode PE may have one or more slits. In another alternative exemplary embodiment, one or more pixel electrodes may be disposed in a pixel. In such an embodiment, different voltages may be applied to the pixel electrodes.

A first alignment layer ALN1 may be disposed on the first substrate 500 on which a plurality of pixels is disposed. The first alignment layer ALN1 is designed to initially align or pretilt liquid crystal molecules in a liquid crystal layer disposed between the first substrate 500 and the second substrate 1000. The first alignment layer ALN1 may include a polymer material that undergoes one of decomposition, dimerization, and isomerization in response to light (e.g., ultraviolet ("UV") light or laser light). In an exemplary embodiment, the first alignment layer ALN1 may include or be made of a polymer polymerized with reactive mesogens.

The first alignment layer ALN1 may be disposed on an entire surface of the first substrate 500. In such an embodiment, the first alignment layer ALN1 may be disposed on both the display area DA and the non-display area NDA of the first substrate 500.

The second substrate 1000 may be disposed to face the first substrate 500.

The second substrate 1000 may include or be made of a material having heat-resisting and light-transmitting properties. The second substrate 1000 may include or be made of, but not limited to, transparent glass or plastic.

A black matrix (not illustrated) and a color filter (not illustrated) may be disposed on the second substrate 1000. The black matrix may suppress the leakage of light between the pixels and the optical interference between adjacent pixels. The black matrix may overlap the source electrode SE, the drain electrode DE, and the semiconductor pattern layer 700 disposed on the first substrate 500. In such an embodiment, the black matrix may cover the data line DL and/or the gate line GL.

The color filter may overlap the pixel electrode PE of each pixel. The color filter may include a red color filter, a blue color filter, or a green color filter.

In an alternative exemplary embodiment, unlike in FIG. 3, the black matrix and/or the color filter may be disposed or formed on the first substrate 500 or may be partially omitted.

An overcoat layer OC may be disposed on the color filter and the black matrix. The overcoat layer OC may include or be made of an organic or inorganic insulating material. The overcoat layer OC may be disposed or formed on the entire area of the second substrate 1000 and function as a planarization layer.

The common electrode CE may be disposed on the overcoat layer OC. The common electrode CE may be an unpatterned, whole-surface electrode. In such an embodiment, no opening is defined in the common electrode CE. A common voltage may be applied to the common electrode CE. In such an embodiment, the common electrode CE may be electrically connected to the common power supply line CL, which will be described later, and receive the common voltage from the common power supply line CL. This will be described in detail later.

A second alignment layer ALN2 may be disposed on the common electrode CE. The second alignment layer ALN2 is designed to initially align or pretilt the liquid crystal molecules in the liquid crystal layer disposed between the first substrate 500 and the second substrate 1000. The second alignment layer ALN2 may include a polymer material that undergoes one of decomposition, dimerization, and isomerization in response to light (e.g., UV light or laser light). In an exemplary embodiment, the second alignment layer ALN2 may include or be made of a polymer polymerized with reactive mesogens.

The second alignment layer ALN2 may be disposed or formed on the entire surface of the common electrode CE disposed on the second substrate 1000 to cover the common electrode CE.

Different voltages may be applied to the common electrode CE and the pixel electrode PE. Accordingly, the common electrode CE and the pixel electrode PE may generate an electric field therebetween, thereby controlling the arrangement or movement of liquid crystals disposed between the first substrate 500 and the second substrate 1000.

The non-display area NDA will now be described with reference to FIG. 4. In an exemplary embodiment, a data driver DU which provides signals and/or voltages for driving the display area DA may be disposed in the non-display area NDA to display an image in the display area DA. At least one data driver DU may be disposed in the non-display area NDA. In an exemplary embodiment, as shown in FIG. 1, the data driver DU may be disposed along the first direction on a side of the display area DA. However, the position of the data driver DU is not limited thereto.

A plurality of wirings electrically connected to the data driver DU may be disposed in the non-display area NDA. The wirings may include, for example, a data fan-out line DFL or the common power supply line CL. The data fan-out line DFL may deliver a data signal received from the data drivers DU to a data line DL of the display area DA.

The common power supply line CL may receive the common voltage from the data driver DU and apply the received common voltage to the common electrode CE of the second substrate 1000. In such an embodiment, the common power supply line CL of the first substrate 500 may be electrically connected to the common electrode CE of the second substrate 1000.

The common power supply line CL of the first substrate 500 and the common electrode CE of the second substrate 1000 will now be described in detail.

In an exemplary embodiment, as shown in FIG. 1, the common power supply line CL may be disposed in the non-display area NDA of the first substrate 500. In an exemplary embodiment, the common power supply line CL may include or be made of the same material as the gate wiring (GL, GE) of the display area DA. In such an embodiment, the common power supply line CL may be disposed in a same layer or directly on a same layer as the gate wiring (GL, GE) of the display area DA, and may include or be made of the same material as the gate wiring (GL, GE). However, this is merely exemplary, and the material of the common power supply line CL is not limited thereto.

In such an embodiment, as shown in FIG. 4, the gate insulating layer GI may be disposed on the common power supply line CL. The passivation layer 600 may be disposed on the gate insulating layer GI. In such an embodiment, the gate insulating layer GI and the passivation layer 600 may be substantially identical to those described above.

The gate insulating layer GI and the passivation layer 600 may include an open portion that defines a second contact hole CNT2. In such an embodiment, the second contact hole CNT2 may be defined or formed through the gate insulating layer GI and the passivation layer 600 to expose at least part of a surface of the common power supply line CL.

A connecting electrode 240 may be disposed on the second contact hole CNT2. The connecting electrode 240 may contact the surface of the common power supply line CL exposed by the second contact hole CNT2. Accordingly, the connecting electrode 240 may be electrically connected to the common power supply line CL.

In an exemplary embodiment, the connecting electrode 240 may include or be made of substantially the same material as the pixel electrode PE of the display area DA. In such an embodiment, the connecting electrode 240 may be disposed in a same layer or directly on a same layer as the pixel electrode PE of the display area DA, and may include or be made of the same material as the pixel electrode PE. However, this is merely exemplary, and the material of the connecting electrode 240 is not limited thereto.

The spacer SP may be disposed on the connecting electrode 240. In an exemplary embodiment, as illustrated in FIG. 1, the spacer SP may be disposed along a boundary line between the display area DA and the non-display area NDA. In such an embodiment, as shown in FIG. 1, the spacer SP extends in the horizontal direction along part of the boundary line between the display area DA and the non-display area NDA. However, the disposition of the spacer SP is not limited thereto. In an alternative exemplary embodiment, the spacer SP may be disposed in a quadrilateral shape along the boundary line between the display area DA and the non-display area NDA.

In an exemplary embodiment, the spacer SP may serve as a sealant which bonds the first substrate 500 and the second substrate 1000 together. In such an embodiment, the spacer SP may include an adhesive member and bond the first substrate 500 and the second substrate 1000 together. However, the invention is not limited thereto. In an alternative embodiment, a sealant separate from the spacer SP may be provided. In such an embodiment, the sealant may be disposed inside or outside the spacer SP.

The spacer SP may have electrical conductivity due to the conductive balls CB included therein. Herein, electrical conductivity means an effectively high electrical conductivity to transfer an electrical signal or voltage. In one exemplary embodiment, for example, the spacer SP may include a plurality of conductive balls CB which will be described later. The conductive balls CB dispersed in the spacer SP may cause the spacer SP to have electrical conductivity.

A lower end of the spacer SP may at least partially contact the connecting electrode 240 of the first substrate 500. Accordingly, the common power supply line CL and the spacer SP may be electrically connected to each other.

An upper end of the spacer SP may at least partially contact the common electrode CE of the second substrate 1000. In an exemplary embodiment, the lower end of the spacer SP may be electrically connected to the common power supply line CL, and the upper end of the spacer SP may be electrically connected to the common electrode CE. Accordingly, the common power supply line CL and the common electrode CE may be electrically connected to each other, and the common voltage may be applied to the common electrode CE.

In an exemplary embodiment, as shown in FIG. 4, an opening is defined through each of the first alignment layer ALN1 and the second alignment layer ALN2 to allow the spacer SP to be electrically connected to the common power supply line CL and the common electrode CE. In an exemplary embodiment of a method of manufacturing an LCD, the first alignment layer ALN1 may be entirely (see FIG. 4) or partially removed (see FIG. 5) from a portion in which the spacer SP and the connecting electrode 240 contact each other, and the second alignment layer ALN2 may be entirely (see FIG. 4) or partially removed (see FIG. 5) from a portion in which the spacer SP and the common electrode CE contact each other, but the invention is not limited thereto.

In such an embodiment, one or more conductive balls CB may be disposed within the spacer SP.

Figure 6:
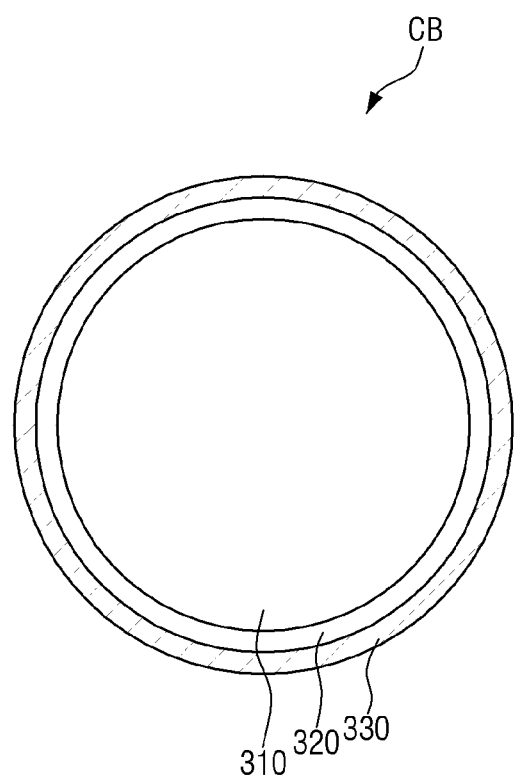
FIG. 6 is a cross-sectional view of a conductive ball according to an embodiment of the invention.

FIG. 6 is a cross-sectional view of a conductive ball CB according to an embodiment of the invention. Referring to FIG. 6, an exemplary embodiment of the conductive ball CB includes a heating solution 310, a packing material 320 which surrounds or stores the heating solution 310, and a conductive layer 330 which covers the packing material 320.

The heating solution 310 may generate heat when applied with pressure. In an exemplary embodiment, a method of manufacturing an LCD may include bonding the first substrate 500 and the second substrate 1000 together by applying pressure to the first substrate 500 and the second substrate 1000. In such a process, a pressure may be applied to the heating solution 310. The pressure applied to the heating solution 310 may cause the heating solution 310 to generate heat. In such an embodiment, the generated heat may at least partially melt the second alignment layer ALN2 and the first alignment layer ALN1 which contact the upper and lower ends of the spacer SP. Accordingly, the upper and lower ends of the spacer SP may directly contact the common electrode CE and the connecting electrode 240.

In such an embodiment, the first and second alignment layers ALN1 and ALN2 disposed on the connecting electrode 240 and the common electrode CE do not have electrical conductivity. Accordingly, the first and second alignment layers ALN1 and ALN2 may hinder the application of the common voltage to the common electrode CE. However, in an exemplary embodiment, where the conductive ball CB includes the heating solution 310 as described above, the heating solution 310 may generate heat in the bonding process, thereby at least partially melting the first and second alignment layers ALN1 and ALN2 which overlap the upper and lower ends of the spacer SP. Accordingly, the common power supply line CL and the common electrode CE may be connected to each other more stably.

The heating solution 310 may be, for example, a supersaturated sodium acetate solution or a supersaturated sodium thiosulfate solution. However, these solutions are merely exemplary, and the type of the heating solution 310 is not limited to the above materials. Any material that may generate heat when applied with pressure may be used for the heating solution 310.

The heating solution 310 may be stored by the packing material 320. The packing material 320 may prevent the leakage of the heating solution 310 before being applied with pressure and store a predetermined amount of the heating solution 310. The packing material 320 may include, for example, resin. However, the material of the packing material 320 is not limited to resin, and any material that may store the heating solution 310, which may be in a liquid state, may be used for the packing material 320.

The conductive layer 330 may be disposed on an outer circumference of the packing material 320 to cover the packing material 320. The conductive layer 330 may include or be made of a metal material having electrical conductivity. However, the material of the conductive layer 330 is not limited to the metal material, and various polymer materials may also be used for the conductive layer 330 as long as they have sufficiently high electrical conductivity.

In an exemplary embodiment, as shown in FIG. 6, the conductive ball CB may include a single conductive layer 330, but the invention is not limited thereto. In an alternative exemplary embodiment, the conductive ball CB may include two or more conductive layers.

The conductive ball CB described above may be included in a plurality in the spacer SP. The conductive layers 320 included in the conductive balls CB may interact with each other to cause the spacer SP to have electrical conductivity.

Hereinafter, an alternative exemplary embodiment of the LCD according to the invention will be described. Hereinafter, elements of such an embodiment substantially identical to those described above have been labeled with the same reference characters as used above, and any repetitive detailed description thereof will hereinafter be omitted or simplified.

Figure 5:
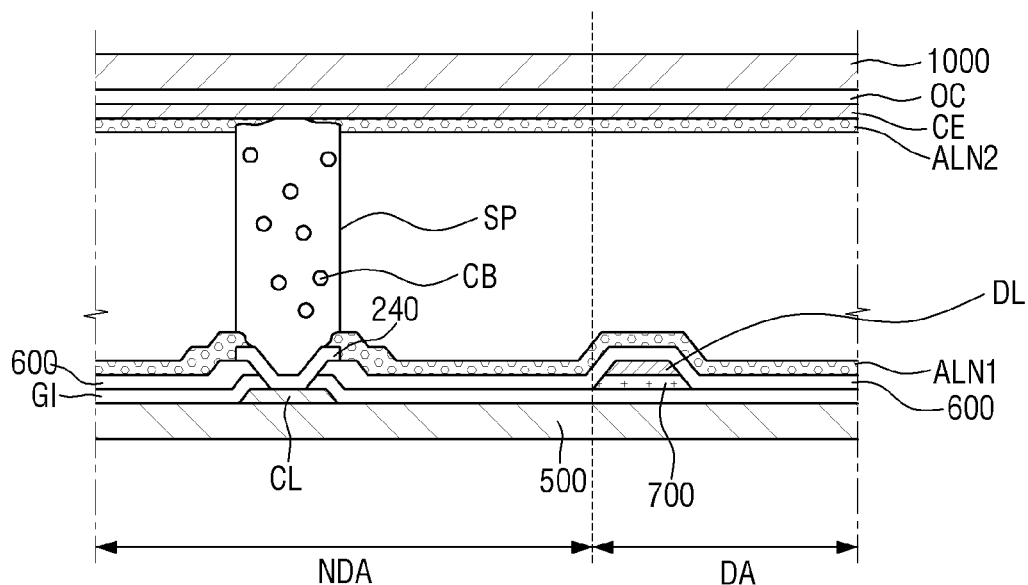
FIG. 5 is a cross-sectional view taken along line II-IF of FIG. 1 according to an alternative embodiment of the invention.

FIG. 5 is a cross-sectional view taken along line II-IF of FIG. 1 according to an alternative embodiment of the invention. Referring to FIG. 5, an alternative exemplary embodiment of the LCD is different from the exemplary embodiment of the LCD shown in FIG. 4 in that a first alignment layer ALN1 and a second alignment layer ALN2 are partially disposed on a common electrode CE and a connecting electrode 240 which overlap an upper end and a lower end of a spacer SP.

In such an embodiment, as described above, the first and second alignment layers ALN1 and ALN2 which overlap the common electrode CE and the connecting electrode 240 overlapping the upper and lower ends of the spacer SP may be at least partially melted and thus removed by a heating solution 310. In such an embodiment, at least part of the second alignment layer ALN2 which overlaps the upper end of the spacer SP may melt to expose a surface of the common electrode CE, and at least part of the first alignment layer ALN1 which overlaps the lower end of the spacer SP may melt to expose a surface of the connecting electrode 240. Accordingly, part of the upper end of the spacer SP may directly contact the common electrode CE, and part of the lower end of the spacer SP may directly contact the connecting electrode 240.

In such an embodiment, a thickness of the second alignment layer ALN2 which overlaps the upper end of the spacer SP may be different from that of the second alignment layer ALN2 which does not overlap the upper end of the spacer SP. In such an embodiment, the thickness of a portion of the second alignment layer ALN2 which overlaps the upper end of the spacer SP may be smaller than that of a portion of the second alignment layer ALN2 which does not overlap the upper end of the spacer SP.

In such an embodiment, a thickness of the first alignment layer ALN1 which overlaps the lower end of the spacer SP may be different from that of the first alignment layer ALN1 which does not overlap the lower end of the spacer SP. In such an embodiment, the thickness of a portion of the first alignment layer ALN1 which overlaps the lower end of the spacer SP may be smaller than that of a portion of the first alignment layer ALN1 which does not overlap the lower end of the spacer SP.

Figure 7:
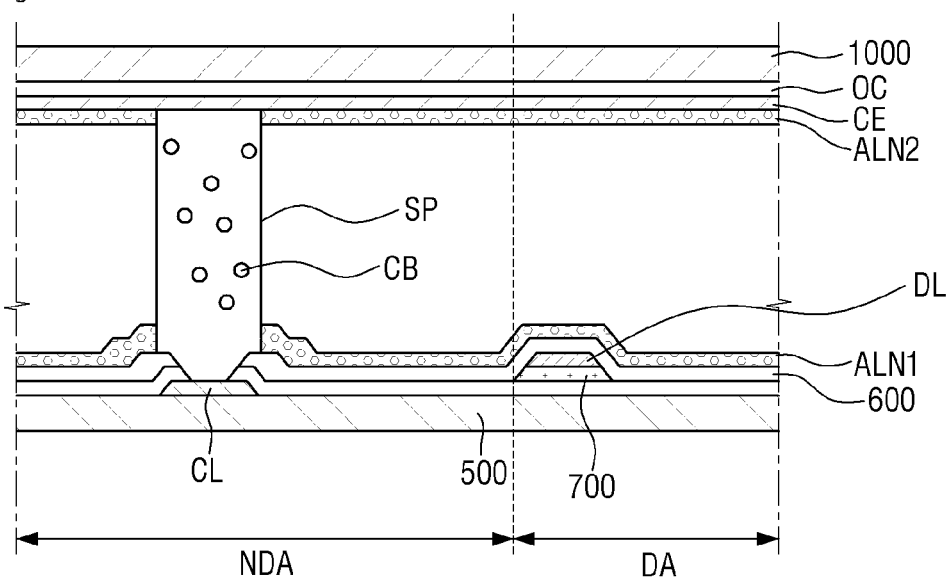
FIG. 7 is a cross-sectional view of an LCD according to another embodiment of the invention.

FIG. 7 is a cross-sectional view of an LCD according to another alternative embodiment of the invention.

Referring to FIG. 7, another alternative exemplary embodiment of the LCD is different from the exemplary embodiment of the LCD shown in FIG. 4 in that a connecting electrode 240 is omitted.

In an exemplary embodiment, as shown in FIG. 7, the connecting electrode 240 may be omitted. In such an embodiment a lower end of a spacer SP may overlap a common power supply line CL. Accordingly, the lower end of the spacer SP may directly contact the common power supply line CL to be electrically connected to the common power supply line CL.

Hereinafter, an exemplary embodiment of a method of manufacturing an LCD according to the invention will be described. Some of the elements to be described below may be substantially identical to those of an array substrate or the LCDs according to the above-described embodiments of the invention, and thus a detailed description thereof will be omitted or simplified for convenience of description.

FIGS. 8 through 11 are cross-sectional views illustrating a method of manufacturing an LCD according to an embodiment of the invention.

Figure 8:
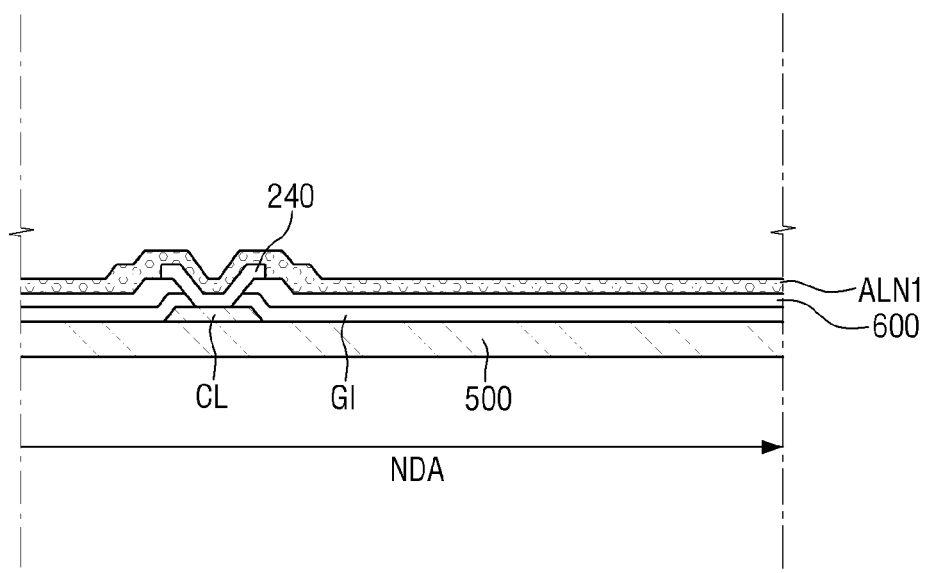
FIGS. 8 through 11 are cross-sectional views illustrating a method of manufacturing an LCD according to an embodiment of the invention.

Referring to FIG. 8, an exemplary embodiment of the method of manufacturing an LCD includes preparing a first substrate 500 on which includes a display area DA and a non-display area NDA disposed around the display area DA are defined, where a common power supply line CL disposed in the non-display area NDA to provide a common voltage, providing a spacer SP, which includes a conductive ball CB, on the common power supply line CL, providing a second substrate 1000, on which a common electrode CE is provided, to face the first substrate 500, and bonding the first substrate 500 and the second substrate 1000 together. In such an embodiment, the conductive ball CB includes a heating solution 310.

First, referring to FIG. 8, the common power supply line CL is provided or formed on the non-display area NDA of the first substrate 500. In an exemplary embodiment, the common power supply line CL may include or be made of a same material as a gate wiring (GL, GE) of the display area DA. In such an embodiment, the common power supply line CL and the gate wiring (GL, GE) may be formed by patterning a same metal layer. However, this is merely exemplary, and the scope of the invention is not limited thereto.

A gate insulating layer GI is provided on the common power supply line CL. The gate insulating layer GI may be formed by, e.g., chemical vapor deposition ("CVD").

Next, a passivation layer 600 is provided on the gate insulating layer GI. The passivation layer 600 may be formed by, e.g., CVD. The gate insulating layer GI and the passivation layer 600 may be substantially identical to those of the embodiments of the LCD described above.

Next, a second contact hole CNT2 is formed to penetrate through the gate insulating layer GI and the passivation layer 600. The second contact hole CNT2 may penetrate through the gate insulating layer GI and the passivation layer 600 to expose at least part of a surface of the common power supply line CL.

In an exemplary embodiment, as described above, the second contact hole CNT2 is formed to penetrate through both the gate insulating layer GI and the passivation layer 600 after the formation of the gate insluting layer GI and the passivation layer 600, but the invention is not limited thereto. In an alternative exemplary embodiment, the second contact hole CNT2 may be formed in each of the gate insulating layer GI and the passivation layer 600, and the second contact holes CNT2 formed in the gate insulating layer GI and the passivation layer 600 may be disposed to overlap each other.

Next, a connecting electrode 240 is provided or formed on the second contact hole CNT2.

The connecting electrode 240 may include or be made of substantially the same material as a pixel electrode PE of the display area DA. In one exemplary embodiment, for example, the pixel electrode PE and the connecting electrode 240 may be formed by patterning a same metal layer. However, this is merely exemplary, and a method of forming the connecting electrode 240 is not limited thereto. In an alternative exemplary embodiment, the connecting electrode 240 and the pixel electrode PE may also be formed independently of each other.

Next, a first alignment layer ALN1 is provided on the connecting electrode 240 and the passivation layer 600. The first alignment layer ALN1 may be provided or formed on an entire surface of the connecting electrode 240 and the passivation layer 600 to cover the connecting electrode 240.

Figure 9:
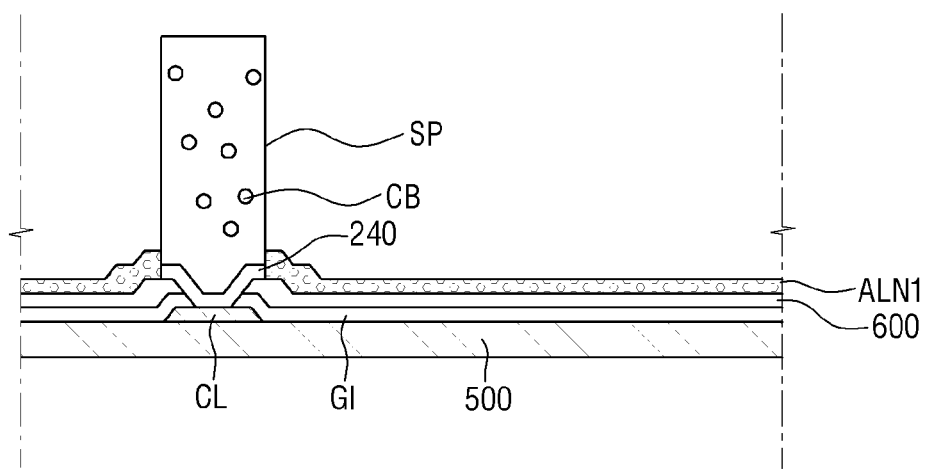

Referring to FIG. 9, the spacer SP is provided or formed on the first alignment layer ALN1.

The spacer SP may be provided to overlap the connecting electrode 240. The conductive ball CB may be provided within the spacer SP. The conductive ball CB may be substantially identical to those described above, and a repetitive detailed description thereof will be omitted.

Figure 10:
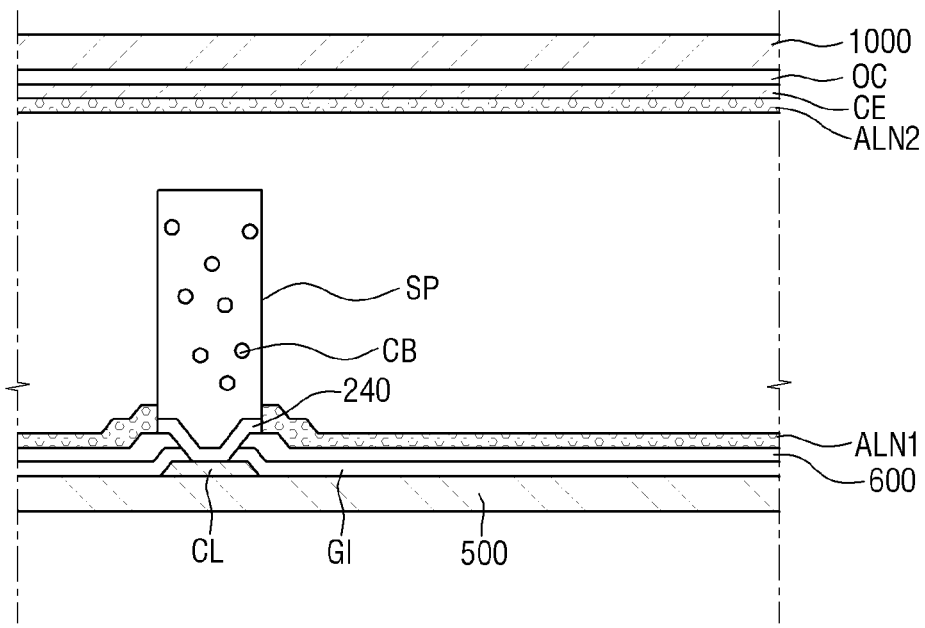

Referring to FIG. 10, the second substrate 1000 is prepared and disposed to face the first substrate 500.

In such an embodiment, a black matrix and/or a color filter may be provided on the second substrate 1000 as described above.

An overcoat layer OC is provided or formed on the second substrate 1000. The overcoat layer OC may include or be made of an organic or inorganic insulating material. The overcoat layer OC may be provided or formed on the entire area of the second substrate 1000 and function as a planarization layer.

The common electrode CE is provided on the overcoat layer OC. The common electrode CE may be an unpatterned electrode or a plate-like electrode.

Figure 11:
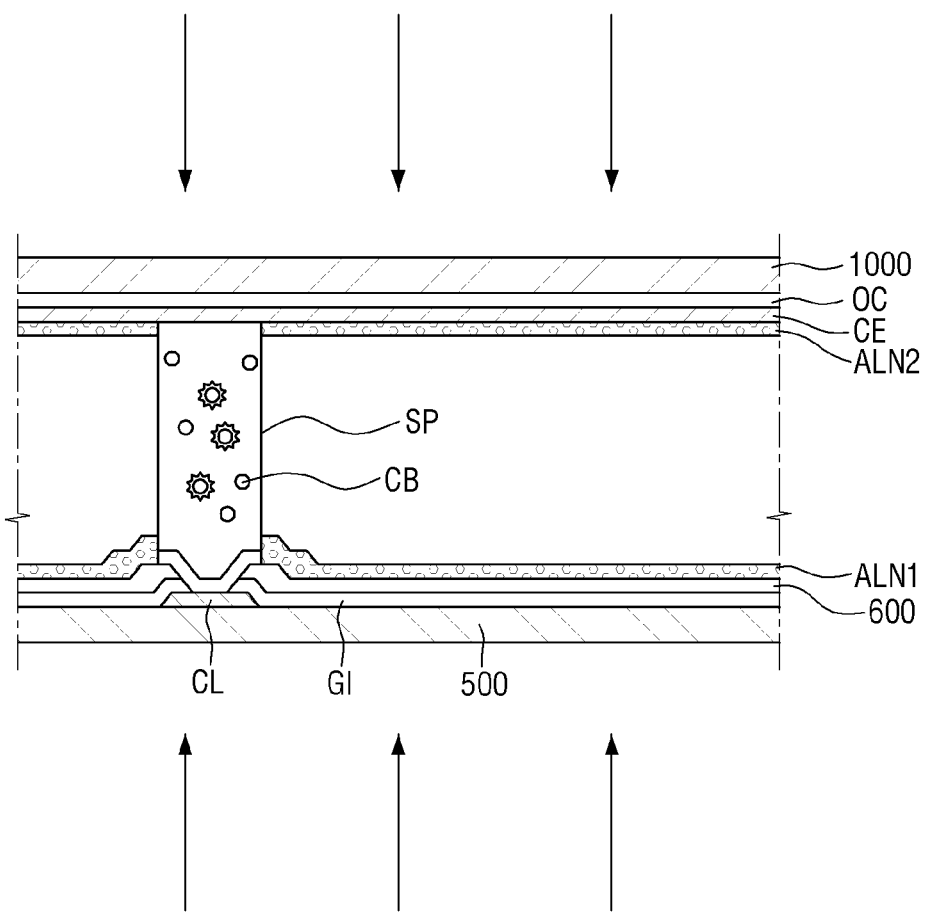

Referring to FIG. 11, the first substrate 500 and the second substrate 1000 are disposed close to each other and bonded together.

In an exemplary embodiment, the first substrate 500 and the second substrate 1000 may be placed close to each other by applying pressure to the first substrate 500 and/or the second substrate 1000. In such an embodiment, an upper end of the spacer SP may overlap the common electrode CE. As the first substrate 500 and the second substrate 1000 are bonded together, a pressure may be applied to the spacer SP. In such an embodiment, a pressure may be applied to the conductive ball CB, thereby causing the heating solution 310 to generate heat. In such an embodiment, the pressure may cause the conductive ball CB to burst. Accordingly, some of the heating solution 310 may come out.

When the heating solution 310 is heated, at least part of each of the first alignment layer ALN1 and the second alignment layer ALN2 which overlap the upper and lower ends of the spacer SP may melt to partially expose respective surfaces of the common electrode CE and the connecting electrode 240 which overlap the upper and lower ends of the spacer SP. Accordingly, the common electrode CE and the connecting electrode 240 may directly contact the spacer SP and may thus be electrically connected to each other.

According to exemplary embodiments of the invention as described herein, an LCD has a structure that may secure a stable electrical connection between a common power supply line and a common electrode in a non-display area, and effectively prevents a contact defect of the common power supply line in the non-display area.

The invention should not be construed as being limited to the exemplary embodiments set forth herein. Rather, these exemplary embodiments are provided so that this disclosure will be thorough and complete and will fully convey the concept of the present invention to those skilled in the art.

While the invention has been particularly illustrated and described with reference to exemplary embodiments thereof, it will be understood by those of ordinary skill in the art that various changes in form and detail may be made therein without departing from the spirit and scope of the invention as defined by the following claims. The exemplary embodiments should be considered in a descriptive sense only and not for purposes of limitation.

What is claimed is:
1. A liquid crystal display comprising:
a first substrate on which a display area and a non-display area disposed around the display area are defined;
a second substrate disposed opposite to the first substrate;
a common electrode disposed on the second substrate;

a common power supply line disposed in the non-display area of the first substrate to provide a common voltage; and a spacer disposed on the common power supply line to connect the common power supply line and the common electrode, wherein the spacer comprises a conductive ball, and wherein the conductive ball comprises a heating solution.

2. The liquid crystal display of claim 1, further comprising:

a first alignment layer disposed on an entire surface of the first substrate; and a second alignment layer disposed on an entire surface of the second substrate.

3. The liquid crystal display of claim 2, wherein a thickness of a portion of the second alignment layer which overlaps an upper end of the spacer is smaller than a thickness of a portion of the second alignment layer which does not overlap the upper end of the spacer.

4. The liquid crystal display of claim 2, wherein the second alignment layer which overlaps an upper end of the spacer exposes at least part of the common electrode.

5. The liquid crystal display of claim 1, further comprising:

a connecting electrode disposed on the common power supply line.

6. The liquid crystal display of claim 5, wherein a lower end of the spacer contacts the connecting electrode, and an upper end of the spacer contacts the common electrode.

7. The liquid crystal display of claim 5, further comprising:

a gate insulating layer disposed on the common power supply line; and a passivation layer disposed on the gate insulating layer, wherein a contact hole is defined through the gate insulating layer and the passivation layer, and the contact hole exposes the common power supply line.

8. The liquid crystal display of claim 7, wherein the connecting electrode is disposed on the contact hole to contact the common power supply line.

9. The liquid crystal display of claim 1, wherein the spacer has electrical conductivity.

10. The liquid crystal display of claim 1, wherein the spacer electrically connects the common power supply line and the common electrode.

11. The liquid crystal display of claim 1, wherein the conductive ball further comprises:

a packing material which stores the heating solution; and a conductive layer which covers the packing material.

12. The liquid crystal display of claim 1, wherein the heating solution generates heat when a pressure is applied to the conductive ball.

13. The liquid crystal display of claim 1, wherein the heating solution comprises a supersaturated sodium acetate solution or a supersaturated sodium thiosulfate solution, which generates heat when a pressure is applied to the conductive ball.

* * * * *